(12) United States Patent
Komarechka

(10) Patent No.: US 7,439,977 B2
(45) Date of Patent: Oct. 21, 2008

(54) METHOD OF DISPLAYING THREE-DIMENSIONAL VECTOR ORIENTATIONS ON A TWO-DIMENSIONAL SURFACE

(76) Inventor: Robert G. Komarechka, 545 Granite Street, Sudbury, Ontario (CA) P3C 2P4

(*) Notice: Subject to any disclaimer, the term of this patent is extended or adjusted under 35 U.S.C. 154(b) by 22 days.

(21) Appl. No.: 10/648,301

(22) Filed: Aug. 27, 2003

(65) Prior Publication Data

US 2005/0057559 A1  Mar. 17, 2005

(51) Int. Cl.
G06T 11/20 (2006.01)
G01R 35/00 (2006.01)
G01V 3/00 (2006.01)
G01V 3/08 (2006.01)

(52) U.S. Cl. .............. 345/440; 345/441; 345/442; 345/443; 324/202; 324/323; 324/345

(58) Field of Classification Search ......... 345/440–443; 324/202, 323, 345
See application file for complete search history.

(56) References Cited

U.S. PATENT DOCUMENTS

| | | | | |
|---|---|---|---|---|
| 3,965,413 | A * | 6/1976 | Yungul | 324/346 |
| 4,768,515 | A * | 9/1988 | Namekawa | 600/455 |
| 4,811,220 | A * | 3/1989 | McEuen | 702/16 |
| 5,592,598 | A * | 1/1997 | Yamrom | 345/423 |
| 5,625,575 | A * | 4/1997 | Goyal et al. | 703/6 |
| 5,694,037 | A * | 12/1997 | Palstra et al. | 324/202 |
| 5,701,897 | A * | 12/1997 | Sano | 600/453 |
| 6,191,587 | B1 * | 2/2001 | Fox | 324/350 |
| 6,242,907 | B1 * | 6/2001 | Clymer et al. | 324/207.17 |
| 2001/0017542 | A1 * | 8/2001 | Kawasaki et al. | 324/251 |
| 2002/0128779 | A1 * | 9/2002 | Kerekes et al. | 702/14 |
| 2005/0165308 | A1 * | 7/2005 | Jacob et al. | 600/443 |

OTHER PUBLICATIONS

Thruston, J.B. "Mapping Remnant Magnetism Using the Local Phase". Geophysics, vol. 66, No. 4, Jul.-Aug. 2001, p. 1082-1089.*
Mueller, E.L., Morris, W.A., Killen, P.G., and Balch, S.. "Combined 3D Interpretation of Airborne, Surface, and Borehole Vector Magnetics at the McConnell Nickel Deposit". Proc. of Explor. 97: Fourth Decennial Internat. Conf. on Mineral Exploration.*

(Continued)

Primary Examiner—Ulka Chauhan
Assistant Examiner—Daniel Washburn
(74) Attorney, Agent, or Firm—Gordon Thomas

(57) ABSTRACT

A method for generating, displaying and manipulating the orientation of three-dimensional vectors on a two-dimensional surface for visualization, statistical analysis and correlation. The method involves collecting vector data, transforming each vector into spherical co-ordinates, then assigning, a unique color related to a position on a spherical color model. A two-dimensional raster image filled with this unique color is centered at the point of measurement for each vector orientation as obtained from calculations or instrumentation capable of measuring this orientation. This methodology offers the user the ability to discriminate the location of specific orientations as well as the ability to define an enhanced full color gamut gradation for a specific range of orientation. This rendering of color-coded vector orientation enables easier understanding by the viewer of large data sets.

6 Claims, 15 Drawing Sheets

OTHER PUBLICATIONS

Crawfis, R., and N. Max. "Direct Volume Visualization of Three-Dimensional Vector Fields". Symp. on vol. Vis, Proc. 1992 workshop on Volume Visualization. Boston, Mass, 1992, pp. 55-60.*

"Visualizing the Magnitude and Direction of Three-Dimensional Vector Fields" by Timothy J. Peter in AP-S International Symposium Digest, IEEE Antennas and Propagation Society, vol. 3, 1993, pp. 1118 to 1121.

"Visualization of Three-Dimensional Vector Fields and Functions" by J. Simkin, IEEE on Visual 3D Fields Digest, 1995/205, pp. 1/1-2.

Vector Field Animation with Texture Maps by B. Yamron, IEEE Computer Graphics and Applications, vol. 15, Part 2, pp. 22 to 24, Mar. 1995.

Combined 3D Interpretation of Airborne, Surface and Borehole Vector Magnetics of Mueller, E. L., L., Moris, W. A., Killeen, P.G., and Balch, S. at the McConnell Nickel Deposit, Proceedings of Exploration 97: Fourth Decennial International Conference on Mineral Exploration, edited by A. G. Gubins, 1997, p. 657-666.

Mapping Remnant Magnetism Using the Local Phase of Thurston, J. B., in Geophysics, vol. 66, No. 4, Jul.-Aug., 2001, p. 1082-1089.

* cited by examiner

Fig. 6

| | 1+00W | | 0+75W | | 0+50W | | 0+25W | | 0+00 | | 0+25E | | 0+50E | | 0+75E | | 1+00E | | 1+25E | |
|---|---|---|---|---|---|---|---|---|---|---|---|---|---|---|---|---|---|---|---|---|
| | θ | φ | θ | φ | θ | φ | θ | φ | θ | φ | θ | φ | θ | φ | θ | φ | θ | φ | θ | φ |
| L15 | 276 | 72 | 276 | 66 | 276 | 66 | 276 | 60 | 276 | 54 | 264 | 66 | 276 | 54 | 270 | 60 | 270 | 54 | 276 | 66 |
| L14 | 276 | 72 | 276 | 72 | 288 | 72 | 288 | 72 | 312 | 66 | 312 | 60 | 276 | 60 | 276 | 60 | 258 | 60 | 276 | 54 |
| L13 | 276 | 66 | 288 | 72 | 318 | 66 | 318 | 66 | 330 | 84 | 324 | 66 | 306 | 60 | 312 | 60 | 276 | 60 | 276 | 60 |
| L12 | 288 | 78 | 288 | 72 | 318 | 66 | 342 | 72 | 354 | 78 | 336 | 72 | 342 | 72 | 324 | 66 | 276 | 66 | 276 | 66 |
| L11 | 276 | 66 | 288 | 72 | 318 | 66 | 354 | 78 | 360 | 77 | 6 | 84 | 24 | 78 | 342 | 72 | 312 | 60 | 276 | 60 |
| L10 | 282 | 72 | 288 | 72 | 318 | 66 | 330 | 72 | 354 | 84 | 48 | 66 | 42 | 72 | 24 | 78 | 330 | 72 | 318 | 66 |
| L09 | 270 | 60 | 264 | 66 | 318 | 66 | 330 | 72 | 354 | 66 | 12 | 60 | 47 | 60 | 18 | 66 | 354 | 78 | 318 | 66 |
| L08 | 276 | 66 | 270 | 60 | 288 | 72 | 318 | 66 | 330 | 72 | 354 | 78 | 24 | 66 | 47 | 72 | 336 | 78 | 318 | 66 |
| L07 | 282 | 60 | 276 | 60 | 270 | 72 | 288 | 72 | 330 | 72 | 354 | 78 | 354 | 78 | 348 | 78 | 318 | 78 | 318 | 72 |
| L06 | 282 | 78 | 282 | 60 | 270 | 66 | 288 | 72 | 318 | 66 | 330 | 78 | 330 | 78 | 330 | 72 | 324 | 72 | 288 | 72 |

Illustration of typical vector colour-coded orientation surface.

Selection of specific sector and segment range with azimuth from 90 to 180 degrees and inclination from -30 to -75 degrees, giving full colour gamut discrimination.

Illustration of coloured areas corresponding to selected sector. Showing enhanced discrimination of orientation.

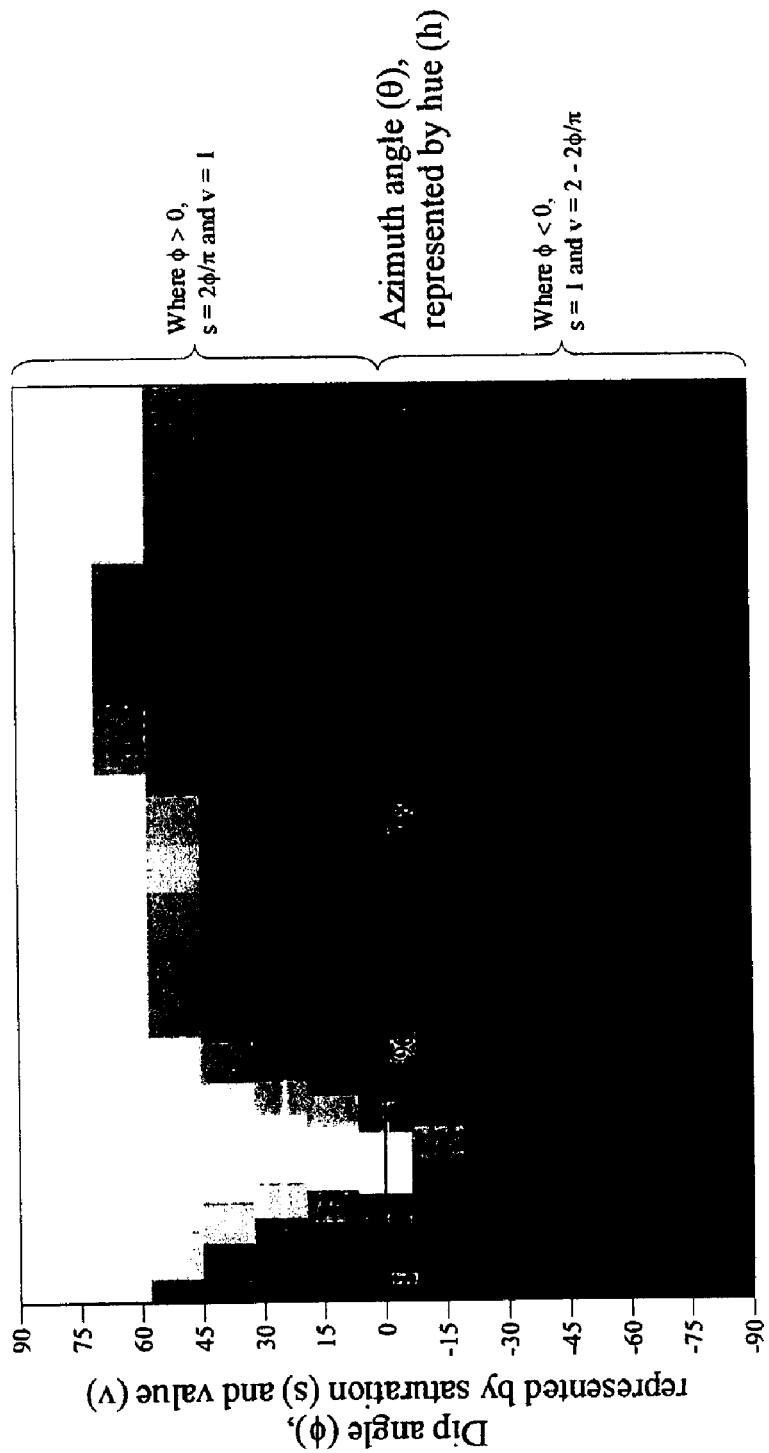

METHOD OF DISPLAYING THREE-DIMENSIONAL VECTOR ORIENTATIONS ON A TWO-DIMENSIONAL SURFACE

FIELD OF THE INVENTION

The present invention relates, in general, to data processing and color-coded raster rendering of information, and more specifically, to a method for displaying the orientation of three-dimensional vector data on a two dimensional display or surface. This methodology has specific applications in the field of geophysical surveys.

BACKGROUND OF THE INVENTION

The term "ferromagnetic" used hereinafter shall constitute the inclusion of antiferromagnetic and ferromagnetic materials.

The term "Currie temperature" or "Currie Point" used hereinafter shall also encompass the Ne'el temperature as would be used in the context of antiferromagnetic and ferromagnetic materials.

In the study of vectors within vector fields it is often useful to correlate information that relates to the magnitude, orientation and spatial relationship of the individual vectors within said field.

While numerous effective methodologies exist for displaying the magnitude of individual vectors, the ability to observe commonality of individual vector orientation within vector fields containing thousands of individual vectors on a surface or within a volume can be difficult to discern.

The applicant is aware of several attempts in prior art, which relate particularly to the visualisation of three-dimensional vector fields. Reference may be had by turning to Form PTO/SB/08B where references are cited thereon.

Remanent

Current methodologies for indicating vector orientation consist of streamlines, hedgehogs, stream-ribbons, stream-polygons and textures maps[3]. In all these methods there are difficulties in observing the vector orientation orthogonal to the observation surface or in selection of unique desired orientations. FIG. 5 of the drawing sheets illustrates a vector grid that shows this effect. A novel texture mapping procedure is hereby disclosed that overcomes many of the shortfalls of the earlier methods.

Many applications exist for the use of an effective display of vector orientation including studies in fluidics, electromagnetic fields, finite element analysis, magneto hydrodynamics, plasma physics, astrophysics magnetic and digital elevation models (DEMs). We will present an embodiment in which the application of the present method is illustrated in the field of geophysical geomagnetic mineral exploration. It is to be recognized that this embodiment is but only one example of the usefulness of this Vector Orientation Visualization Method.

Geomagnetic surveys have many uses and are of particular interest in mineral exploration, as they may identify areas likely to contain some types of valuable deposits. They can also identify various lithologies, and provide some types of structural information.

A common method of performing such a survey is to measure the magnetic field at various points along the Earth's surface while recording the magnitude variations in the magnetic field strength. Although dip needle surveys have been used in the past, until recently, the orientation of the magnetic field was not generally measured. The magnitude of variations in the readings was primarily due to variations in the magnetic susceptibility of the constituent minerals within the rock, and to a much lesser degree, the variation of the orientation of the remanent field. Such surveys, while giving useful data, which related primarily to lithological effects, disregarded the information of the orientation of the magnetic field.

Recently, due to the introduction of tri-axial gradient magnetometer surveys, it has become possible to retrieve vector oriented gradient data. In addition, tri-axial fluxgate total magnetometer surveys can also be used to measure the orientation of the total magnetic field vector. Tri-axial fluxgate magnetometers have also been used in along a borehole to effectively delineate the partial outline of a dipole about a ferromagnetic ore body[4].

The ability to effectively display the orientation of the magnetic vectors over a surface or within a block of rock as by borehole surveys can greatly add to the geologic understanding of the survey area and can lead to a better understanding of the location and extent of several varieties of ore deposits.

To understand the benefit of knowing the orientation of the vectors within the survey area it is important to understand the means by which variations in the orientation of the vectors can occur. After a high temperature thermal event, certain minerals in the earth will heat enough beyond their Currie Point Ne'el temperature to lose their magnetism. When the temperature lowers, these minerals regain their magnetism and will now have a thermal remanent magnetic field aligned with that of the earth at the time of going through their Currie temperature. Since the earth's magnetic field is known to change directions and flip at various times, the differently oriented remanent magnetic vectors of these remagnetized minerals can indicate spatially segregated intrusives of contemporaneous age, multiple pulsed intrusives within a similar rock type, the extent of their thermal aureoles and the presence of folds and faults. Similarly alteration due to chemical—known as chemical remanent magnetism, CRM—and pressure changes—known as piezo remanent magnetism—can result in the formation of new minerals, which will retain a remanent orientation of the earth's field orientation at that time—known as detrital remanent magnetism (DRM) caused by the quiescent sedimentation of fine magnetic material aligning with the earth's magnetic field at the time of sedimentation.—DRM is another remnance whose variation can be used to recognize later faults and folds.

For the purpose of this embodiment a magnetic survey can be performed using either a tri-axial fluxgate magnetometer or tri-axial gradient magnetometer. The vertical gradient can also be calculated if both horizontal gradients and the total magnetic field are known. These types of surveys produce the magnitude of the magnetic field for each of the three-orthogonal directions. The data is collected for process and analysis over the survey area by establishing a two-dimensional grid over the area of interest. Measurements of the magnetic field are taken at specific points on the grid either by aircraft or by an operator on the ground working along a cut or demarked grid. Each collection point is identified as a point on the two-dimensional grid, and will have an associated three-dimensional vector representing the magnetic field at that point. Alternatively, if the data should be collected along a borehole as a function of its distance from the collar, the location of the three-dimensional vector can be represented from the surveyed borehole information as a point in 3D space with x, y, z co-ordinates. The x,y co-ordinates can match the two dimensional grid of the surveyed area of interest mentioned earlier.

Peters Reference[1]: This reference describes a method of representing an electromagnetic vector field defined over a three-dimensional surface. A triangular grid represents the surface, and the method uses color shaded magnitude contours and directed vector lines to characterize the vector field. Referring to the FIGURES, it may be seen that in this reference, the direction of a vector field is represented using arrows, and the magnitude of the vector field is displayed using colors. Such visualization is suited to vector fields for which the direction changes gradually and continuously. The magnitude of the vector field can then be visually identified by the intensity of the colours used.

Simkin Reference[2]: This reference provides an overview of three-dimensional visualization, and only contemplates displaying vectors using arrows. The direction of the vector is shown using arrows while the length of the arrow visualizes the magnitude, In other words, the longer the arrow, and the higher the magnitude of the vector.

Yamrom Reference[3]: This reference describes a method of animating vector fields and discusses the subject matter of displaying a 3D-vector field by changing the texture of the viewed surface with respect to time.

SUMMARY OF THE INVENTION

According to an aspect of the present invention, there is provided a method of displaying three-dimensional vector field information on a two-dimensional display. After collecting the information from an area of interest, the Cartesian vectors are transformed into spherical co-ordinates. A colour model such as Munsell, HSV, HLS, or YIQ, is modified into a spherical colour model. In the embodiment of the modified HSV model, the spherical model is developed such that Hue is distributed evenly along the equator while the Value varies from white at the North Pole to black at the South Pole. Each of the vectors are plotted emanating from the origin of the coloured sphere using their spherical co-ordinates. An HSV colour is assigned to the area of the vector on the map based on the colour occurring at the corresponding piercing point of the vector with the designated HSV spherical colour model surface. This HSV colour is then used to fill the area or volume of influence of the vector. In the case of a monitor display the HSV values are converted to their corresponding RGB values. Ability exists using this model to define a particular orientation range of azimuth and dip such that the whole colour gamut may be displayed within a narrow range and hence further delineate variations in orientation.

The utility of this methodology includes but is not limited to geophysical surveys.

For purposes of clarification and to provide a fill disclosure, it was deemed absolute that color drawing be included in the present application in order to fully understand the scope of inventiveness.

BRIEF DESCRIPTION OF THE DRAWINGS

These and other advantages of the invention will become apparent upon reading the following detailed description and upon referring to the drawings in which:

FIG. 6 illustrates the notation used in the orientation of the axis and coordinate systems.

FIG. 13 HSV colour assignment illustrates the relationship of the observed geological spherical co-ordinates and the development of the modified HSV spherical colour model.

Figure 1:
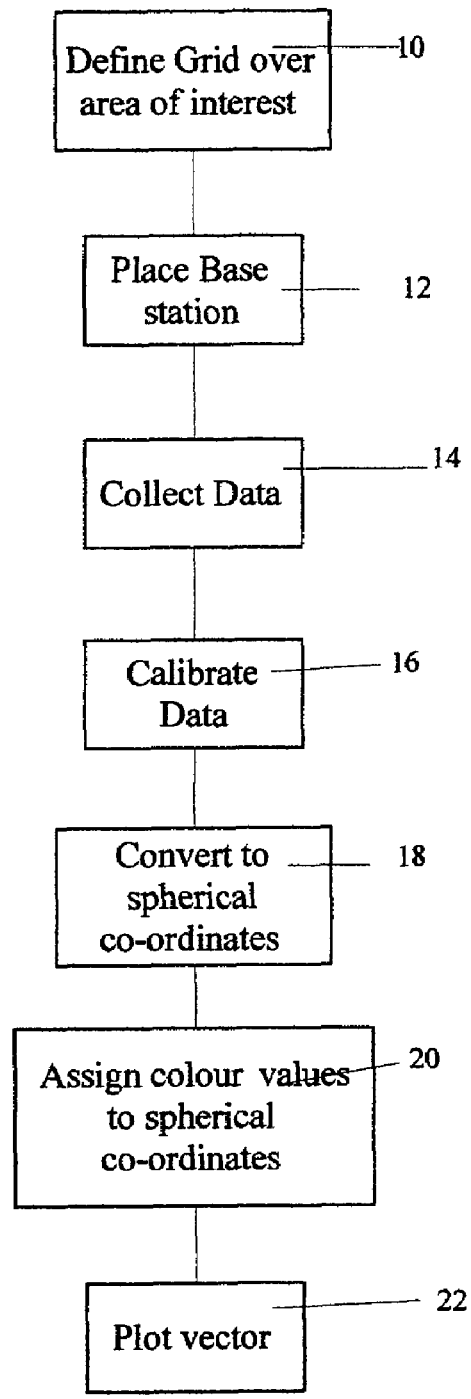
FIG. 1 is a flowchart outlining an embodiment of a method of data collection and display of three-dimensional information using a two-dimensional display.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENT

In the following description, similar features in the drawings have been given similar reference numerals.

Figure 1A:
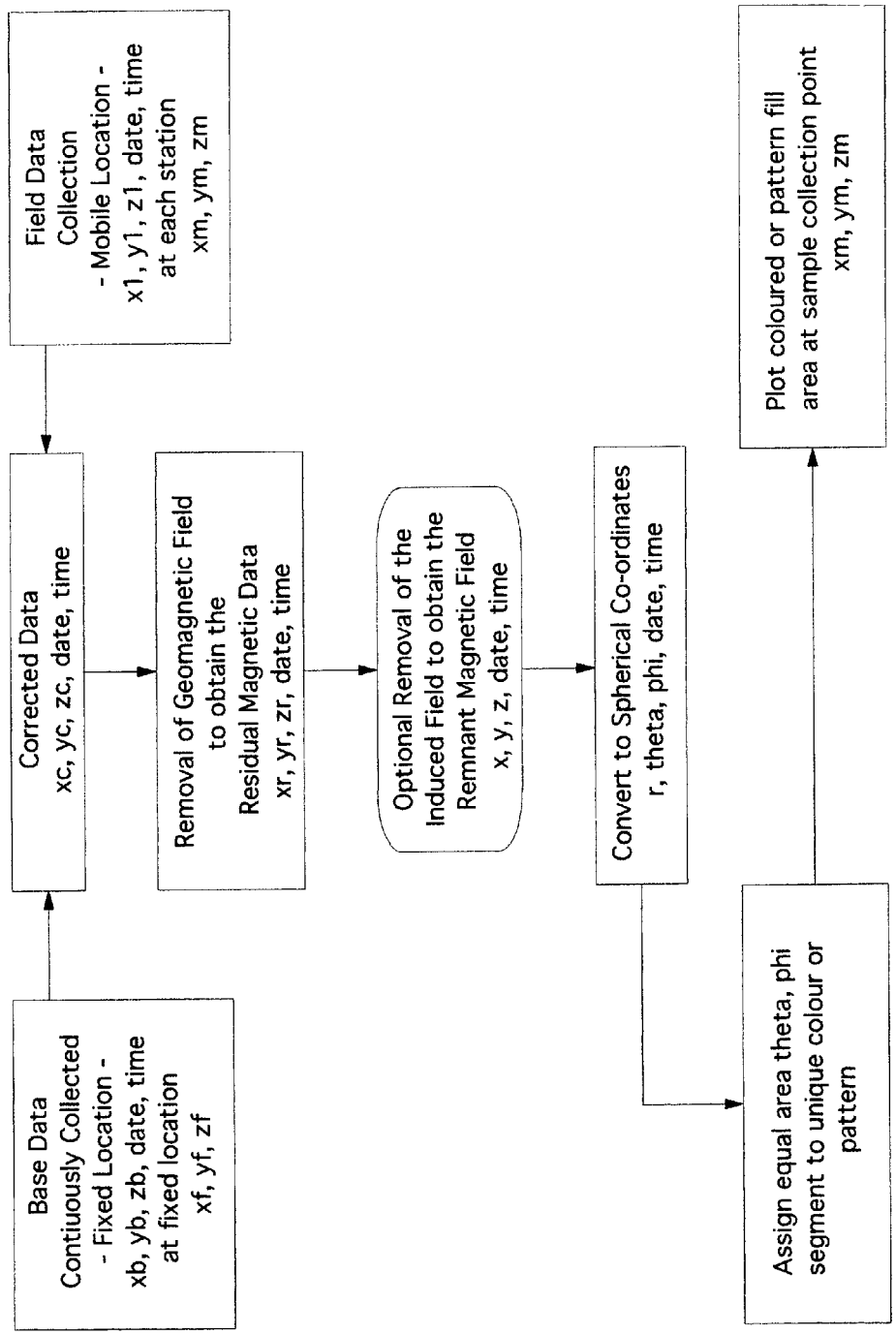
FIG. 1a is a flowchart outlining an embodiment of a method of data collection and display of three-dimensional information using a two-dimensional display and indicating the variables used to describe the data and its manipulation.

Turning to FIG. 1, a flowchart outlining an embodiment of a method of displaying three-dimensional information, such as three-dimensional vectors, using a two-dimensional display, is shown. More specifically, the present embodiment is directed at the collection of three-dimensional magnetic field data 14 in an area of interest 10 on the surface of the Earth from a plurality of mobile stations to extract the residual magnetic field orientation of the underlying rocks. Said data is then calibrated 16 at a base station 12, converted to spherical co-ordinates 18, assigned colour values 20 then plotted 22 to a two-dimensional surface. A further detail of this flowchart and the variable names used to describe this data is shown in FIG. 1a. Although the present embodiment is directed at a method of displaying three-dimensional magnetic field vectors for use in the study of geophysics, thermodynamics, fluidics, plasma physics, magneto hydrodynamics and the like, the method may also be used to display vectors representing any three-dimensional information in a two-dimensional display.

Figure 2:
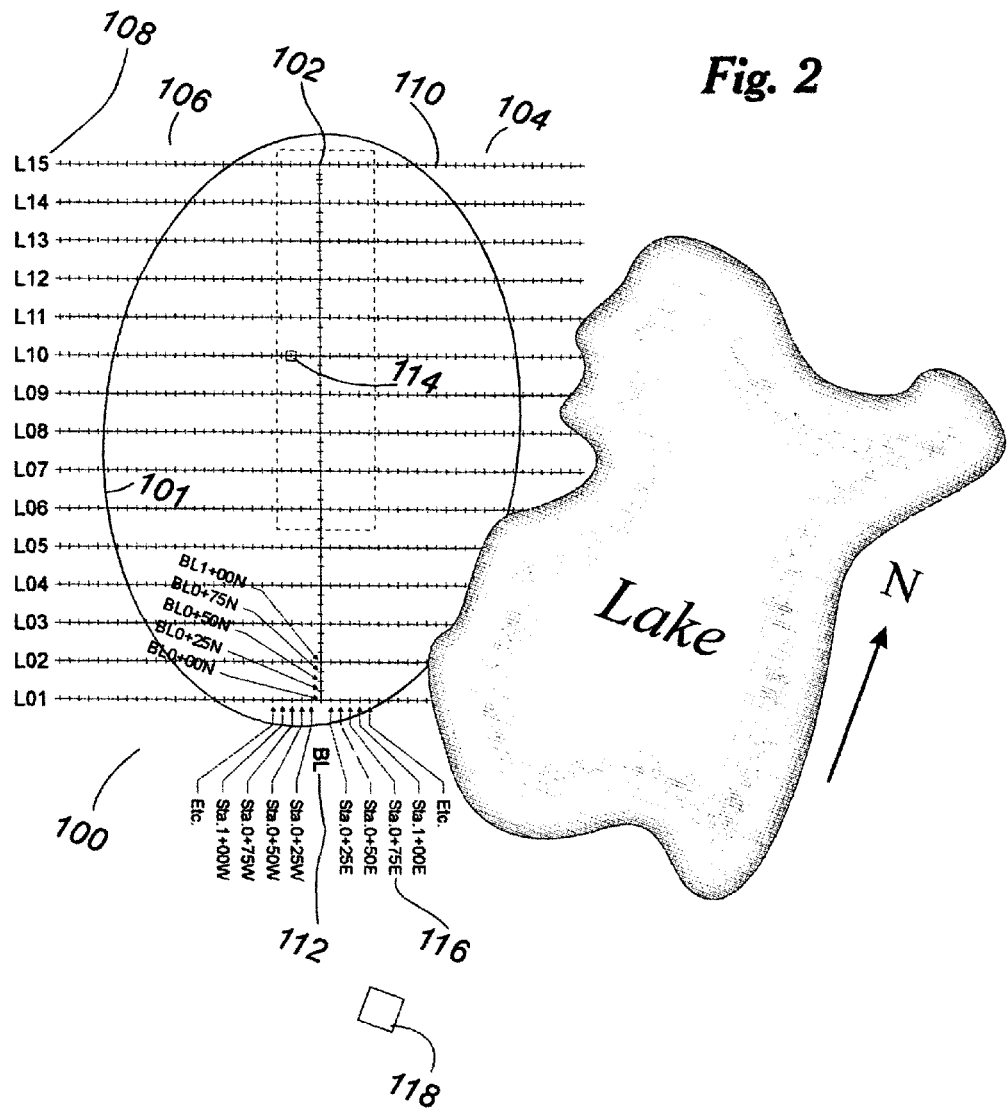
FIG. 2 is a schematic diagram of a grid of irregular outline established to define the collection sites of the three-dimensional information.

Initially, in the case of a surface ground based geomagnetic survey the area of interest is selected and defined by setting up a grid over the area form which the magnetic field data is to be collected 10, in the case of an aircraft survey, location of the flight lines would be obtained by utilizing rapid precision Global Positioning System (GPS) equipment. FIG. 2 illustrates an example of a grid 100 including a carefully laid out baseline 102 which is located centrally within the grid and more or less parallel to the feature desiring investigation and dividing the grid area into two parts 104 and 106. This baseline 102 is cut free of brush and trees so as to allow for a line of sight to measure out the locations of the lines 112. Due to the trend of the baseline in FIG. 2 being in a more or less South-North direction, each side of the baseline is segregated in an Eastern and Western section respectively. Lines 112 perpendicular to the baseline 102 further define the grid 100 and are demarked from the baseline via surveying or by the use of a turning board. Said lines 112 are then blazed or line cut and picketed at regular station intervals for later measurement with the instrument. In the exemplary illustration presented, the lines 112 are shown 100-meters apart with measuring stations 116 at 25-meter intervals along the line emanating from the baseline 102. For computational purposes, an outline of rectangular area 114 is defined around each of the measuring stations 116 as follows: In the direction of the lines 112, the opposite sides of the rectangle are located at the midpoint of each of the consecutive measuring stations 116, which in the example case would be 12.5 meters. In our example, 12.5 meters would be used to define the on-line rectangle dimension of the measuring stations at the end of each of the lines 112. Orthogonal to this, the distance between sides of the rectangle can be arbitrarily set between the previously determined online side-dimension as a minimum and the distance between lines 112 as a maximum. Various algorithms are known in the art for calculation of values between lines 112.

At each of the measuring stations 116, the magnetic field data, the time of the measurement and the station location is recorded within the grid 100.

In order to distinguish measurements from the various measuring stations 116, the measuring stations are denoted as LN(orientation)+(distance)(section). This is a standard notation in the exploration industry in North America and is further explained below. The 'LN' values represents the measuring station's line location with respect to a selected origin of the baseline 102 with L0+00 representing the measuring station at the origin on L00+00. In our example, since the lines 112 are orthogonal to the baseline and 100-meters apart, n=BLdistance/100, 'distance' being the distance along the baseline 102 from the selected origin. As one progresses in a northward 'orientation', the lines 112 are sequentially labelled L00, L01N, L02N . . . LN with (N+1) being the number of lines 112. The 'distance' value represents the distance the measuring station 116 is located away from the baseline 102 and the 'section' value represents the section 104 or 106 in which the measuring station is located. Therefore, for a measuring station in the Eastern section 104 located 50-meters northward away from the baseline 102 on the perpendicular line corresponding to L04N, this measuring station may be denoted as L04N+50E. In the grid of FIG. 2, the number of baseline measuring stations 116 is indicated by the tick marks along the lines 112. Further reference to FIG. 2 illustrates the designation of the measuring stations 116 along the baseline. In respect to those measuring stations 116 occurring along the baseline the notation BL(orientation)+(BLdistance)(direction) is used.

After the grid 100 has been defined, a magnetically quiet area, close to the grid, is selected so that a tri-axial magnetometer base station 118 may be located (step 12) and appropriately positioned to collect signals which are used to assist in the calibration of the signals collected at the measuring stations 116 The base station 118 instrument's clock is set to match the clock of the portable mobile tri-axial instrument. This will be described in more detail below.

Prior to collecting the data (step 14) the operator initially records, from a distance, x,y,z readings in a magnetically quiet area with the tri-axial magnetometer, this could be a tri-axial fluxgate instrument suspended at the proper height and orientation by a remote nonmagnetic device. A second set of readings is then taken in the same location with the operator holding the instrument in the normal manner to take a reading. These two readings are recorded so that any magnetic effect from the presence of the operator can be removed. This procedure may be undertaken to confirm a consistent operator null correction Having undertaken the above operator nulling procedure, the operator walks with the instrument along the baseline and lines such that the individual bypasses each measuring station at least once. At each measuring station, the individual records and stores magnetic field data in the form of magnetic field vector information along with the station location and the time the measurement is recorded. Care is taken in the positioning and orientation of the instrument, aided by a sighting and levelling device to maintain a consistent x,y,z orientation of the probes. The magnetic field vector information collected includes information corresponding to the magnitude and direction of the magnetic field at the measuring station location. This may be achieved by simply writing down the magnetic field data on a notepad or by entering such information into a data collector for later dumping on a computer. The recorded signals $X_1, Y_1$ and $Z_1$ may be represented as $X_m, Y_m$ and $Z_m$ with "$_m$" representing the measuring station designation.

At the end of each days work after the individual has collected the magnetic field data from each of the measuring stations visited, the individual retrieves calibration information from the base station corresponding to the time period over which the magnetic field data was being recorded. After retrieving the calibration information from the base station, the calibration information and the recorded signals are stored in a computer and the recorded signals are calibrated. This is a standard procedure known to those skilled in the art.

The calibration process allows for the magnetic field data retrieved from the measuring stations to be a truer indication of their actual magnitude and direction. It will be understood that the magnetic field data may be affected by external conditions such as solar storms or diurnal variations.

Figure 3:
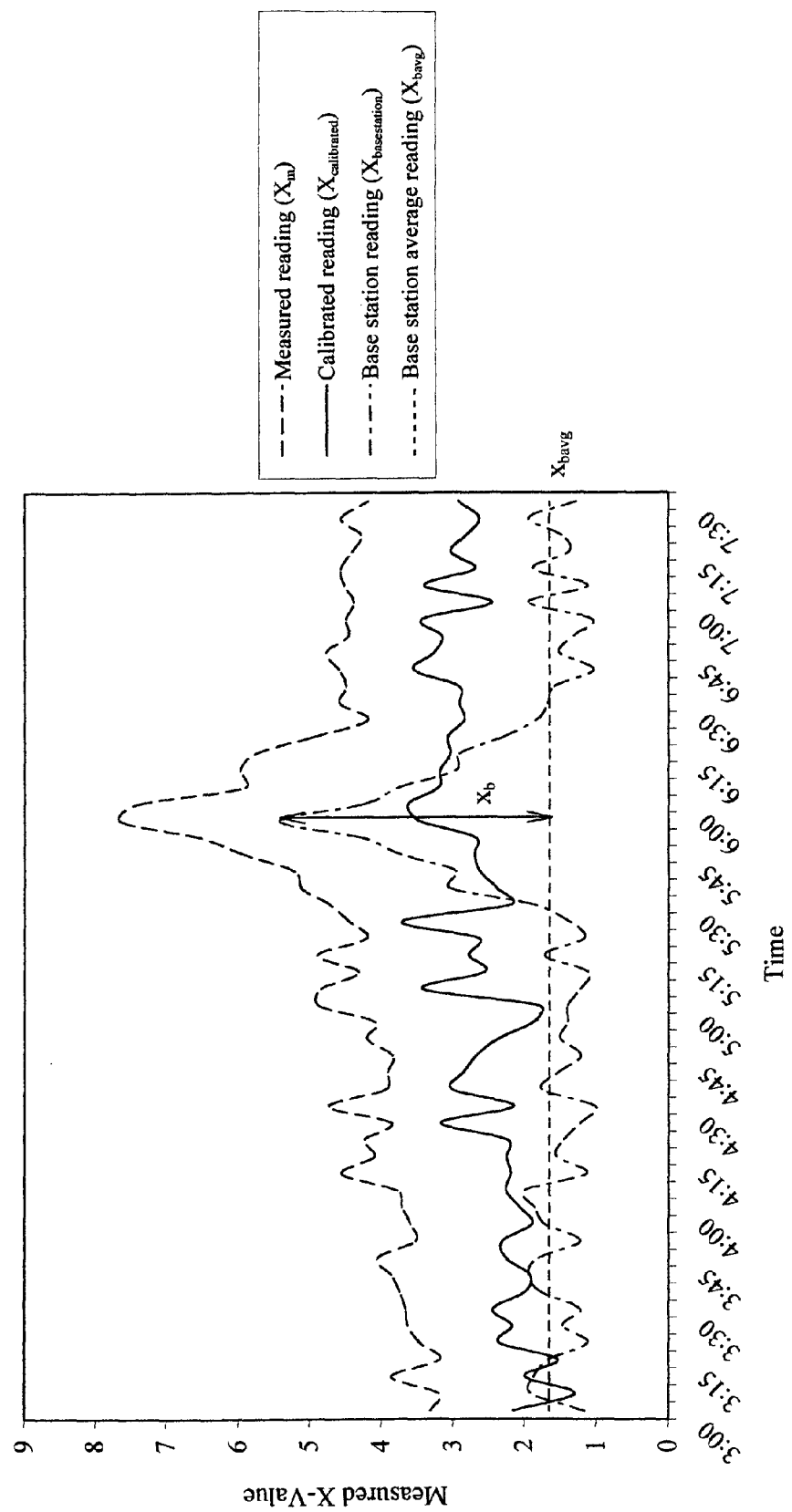
FIG. 3 is an example of a standard base station calibration.

Turning to FIG. 3, a sample display of calibration information is shown. Base station averages, $X_{bavg}, Y_{bavg}$, and $Z_{bavg}$, are calculated by averaging the magnitude of the stable magnetic field vector, in the X, Y and Z directions at the base station over the time period of the survey. Since the base station is assumed to be located in a magnetically quiet location away from vehicular traffic, power lines, transmitter sites, etc. it may be assumed that any recorded deviations from the base station stable average indicates that any measurements taken at that instance in time have been affected by the same external condition. For instance, at time=6:15, as indicated on FIG. 3, the X value measured at the base station is seen as a spurious $X_b$ positive peak above the pre-calculated average, $X_b$ and therefore a base station calibration correction value $X_{basestation}$ equals the absolute value between $X_b$ and the pre-calculated average, $X_{bavg}$.

After selecting a first-recorded signal $X_m$, $Y_m$, $Z_m$ from the mobile station, the time at which the signal was recorded is retrieved. The calibration values for this time is then calculated as explained above. If the reading was taken at 6:15, the base-station calibration values $X_{basestation6:15}$, $Y_{basestation6:15}$, and $Z_{basestation6:15}$ are retrieved and subtracted from the measuring station values $X_m$, $Y_m$ and $Z_m$ corresponding to the first recorded signal in order to perform a first step of calibrating the measuring station value. After the first reading is calibrated, the magnetic field data from a second reading is selected and calibrated by retrieving the time measurement from the magnetic field data and calculating and retrieving the calibration values corresponding to that time measurement. This step is repeated until all of the magnetic field data from each of the measuring stations is calibrated. Therefore $X_{calibrated}$ equals $X_m - X_{basestation(time)}$ which is equal to $X_m - |X_{bavg} - X_{b(time)}|$. Values for $Y_{calibrated}$ and $Z_{calibrated}$ are calculated in a similar manner.

After the values $X_{calibrated}$, $Y_{calibrated}$ and $Z_{calibrated}$ for each measuring station have been calculated. A second step may be performed to remove the geomagnetic field vector from these values in order to obtain a residual magnetic value from the magnetic field data.

This is achieved by calculating the Earth's magnetic field using the standard International Geomagnetic Reference Field (IGRF) procedures to determine the theoretical values with respect to the area of interest at the time of the survey These theoretical values obtained may be represented as $X_{igrf}$, $Y_{igrf}$ and $Z_{igrf}$.

The residual magnetic data values $X_{residual}$, $Y_{residual}$ and $Z_{residual}$ may then be calculated from the equations $X_{calibrated} - X_{igrf}$, $Y_{calibrated} - Y_{igrf}$ and $Z_{calibrated} - Z_{igrf}$ respectively.

After calculating the residual magnetic values, further methods known to the trade[5] may be performed which causes the induced magnetic field value to be removed from the residual magnetic data values to obtain remanent field values at the measuring stations.

In order to calculate the remanent values $X_{remanent}$, $Y_{remanent}$ and $Z_{remanent}$, the equations $X_{residual} - X_{induced}$, $Y_{residual} - Y_{induced}$, and $Z_{residual} - Z_{induced}$, are respectively determined. The remanent value represent the magnetic field data values were frequently acquired at the time the ferromagnetic rock forming minerals were formed or went through a Currie temperature episode of its ferromagnetic minerals. This remanent vector data can allow for the discrimination. After calculating either the residual or remanent data these x, y, z Cartesian values are transformed to mathematical spherical co-ordinates using the following equations:

$r_{math}$=squareroot$(X^2+Y^2+Z^2)$ where r is the radius of the unit sphere used to determine spherical coordinates;

$\Theta$(theta)$_{math}$=arctan $(Y/X)$ where theta represents the azimuth angle, which is measured from the positive x-axis toward the positive y-axis theta and is a value between 0° and 360°;

$\Phi$(phi)$_{math}$=arctan $((squareroot(X^2+Y^2)/Z)$ where phi is the angle measured from the vertical positive z axis counterclockwise toward the x,y plane and is a value between 0° to 180°.

Figure 4:
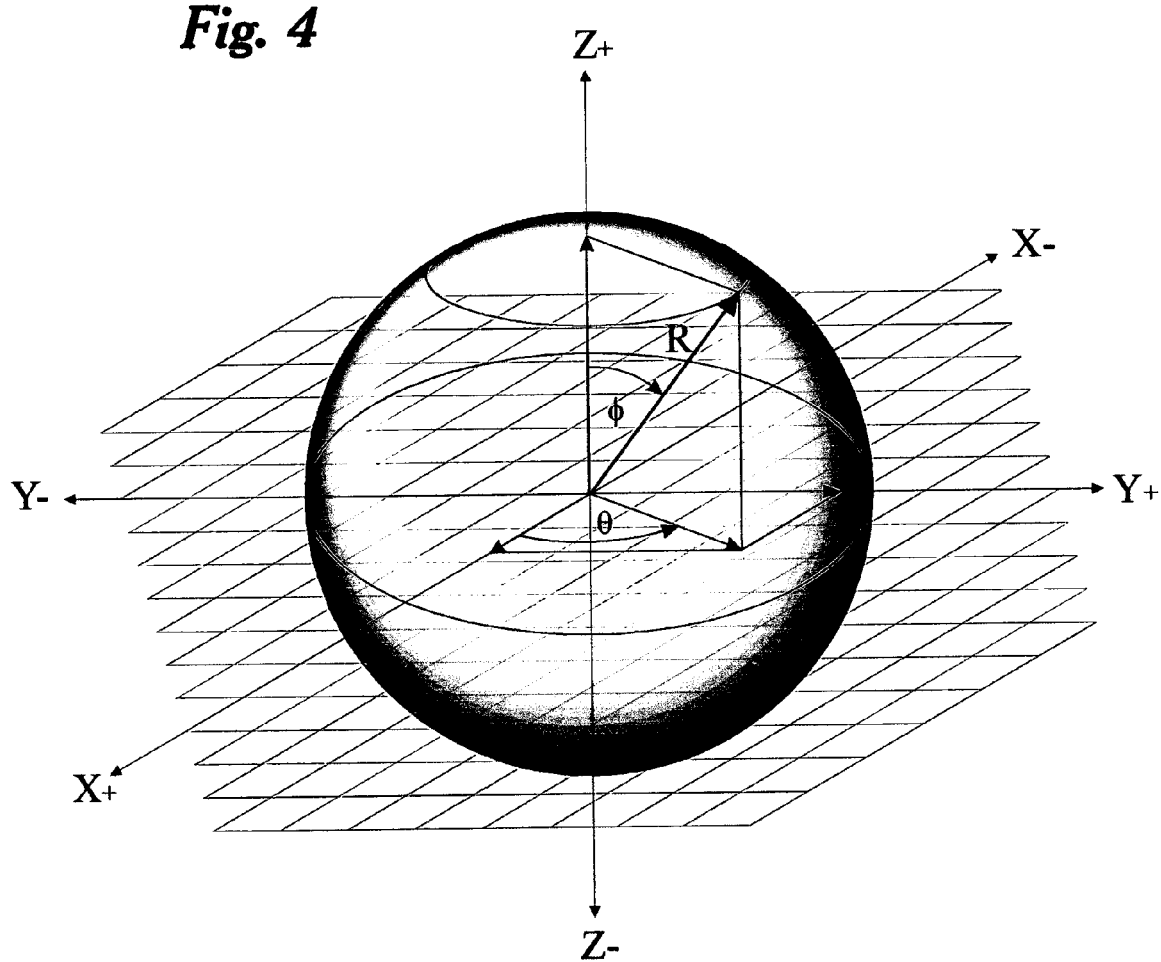
FIG. 4 is an illustration of the definition of a spherical co-ordinate system based on Mathematical Conventions.

These mathematical spherical co-ordinates are illustrated clearly in FIG. 4.

The mathematical spherical co-ordinates of the magnetic vector at each measuring station may then be represented by $(r_{math}, \Theta_{math}, \Phi_{math})$.

Figure 4A:
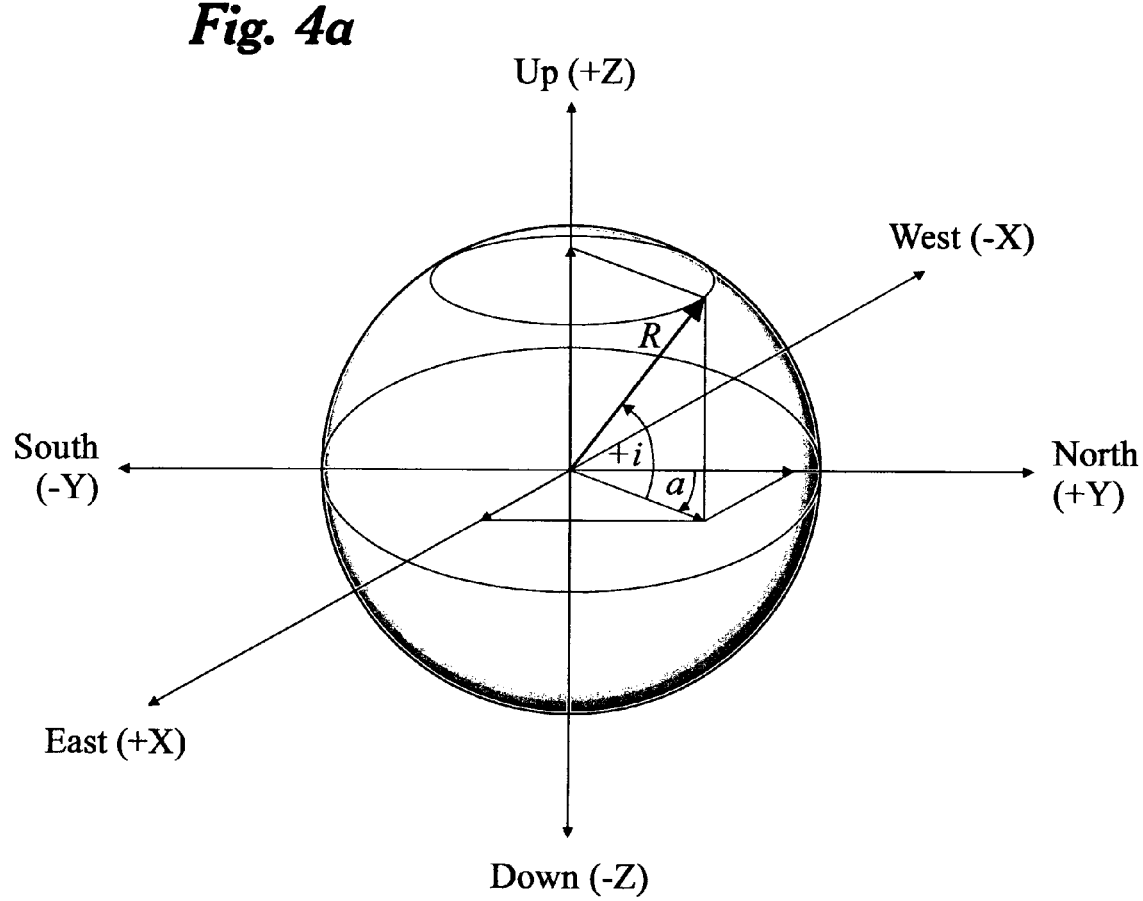
FIG. 4a is an illustration of the definition of a spherical co-ordinate system based on Geological Conventions.

A conversion of the mathematical spherical co-ordinates $(r_{math}, \Theta_{math}, \Phi_{math})$ is then translated into the geological co-ordinates $(r_g, \Theta_g, \Phi_g)$ by the following equation:

$(r_g, \Theta_g, \Phi_g)$=[$(r_{math})$, $(\Theta_{math}-270)$, $(90-\Phi_{math})$] as clearly illustrated in FIG. 4a. These values are tabled in FIG. 8.

After calculating the geological spherical co-ordinates for each measuring station, a unique colour based legend may be determined by assigning colour or patterns to the spherical co-ordinates. Several colour models or notations exist which have direct symmetry with respect to spherical co-ordinates such as red, green, blue (RGB); Commission Internationale de l'Eclairage (CIE), hue, saturation, value (HSV); hue, saturation, luminance (HSL), CIE XYZ, YIQ, Munsell, TekHVC, CIE LUV etc . . . The last three of these models allow for a more continuous perception of colour to the human eye. Although any of these colour models may be used in the preparation of a suitable colour model via the proper mathematical translation. In this embodiment a modified spherical HSV colour model is used, where hue variation is assigned the azimuth angle. Axial symmetry about dipole axis may also be illustrated by having hue vary as dip.

One example of assigning spherical co-ordinates to an HSV model may be realized by the following two equations, the use of each being dependent on the value of phi:

When $\Phi$>0[H, S, V]=[$(\Theta_g)$, $(2\Phi_g/\pi)$, (1)], when $\Phi$<0 [H, S, V]=[$(\Theta_g)$, (1), $(2-2\Phi_g/\pi)$], FIG. 6 illustrates this colour assignment.

The above assignment relates a unique HSV colour value to the direction of a three dimensional vector corresponding to measured and calculated values from the measuring stations which can be applied to the area of interest.

Figure 9:
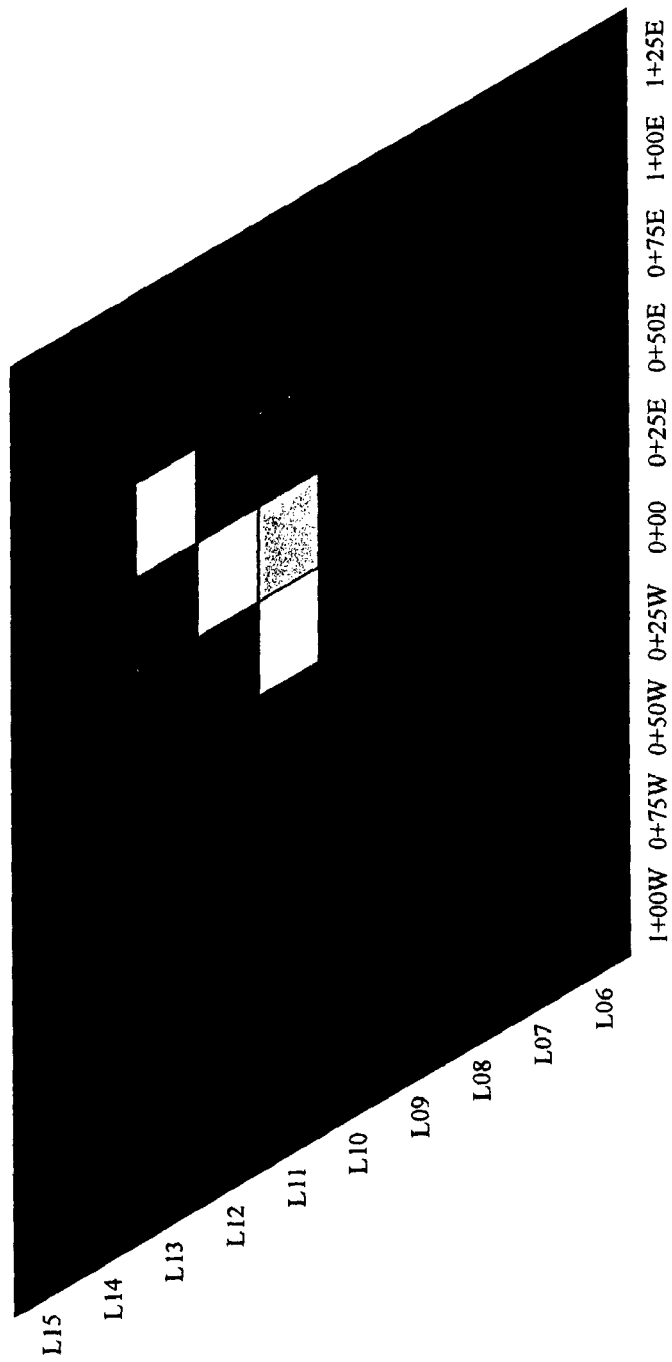
FIG. 9 is a table illustrating assigned HSV colour values to the 3D vectors as per the grid in FIG. 2.

FIG. 9 graphically illustrates this principle. The particular range of values for the HSV colour values defines the limits of the above mathematical expressions. However, other parametric vector assignments can be used for different colour models or for the creation of a new unique colour model or even textural patterns.

Figure 5:
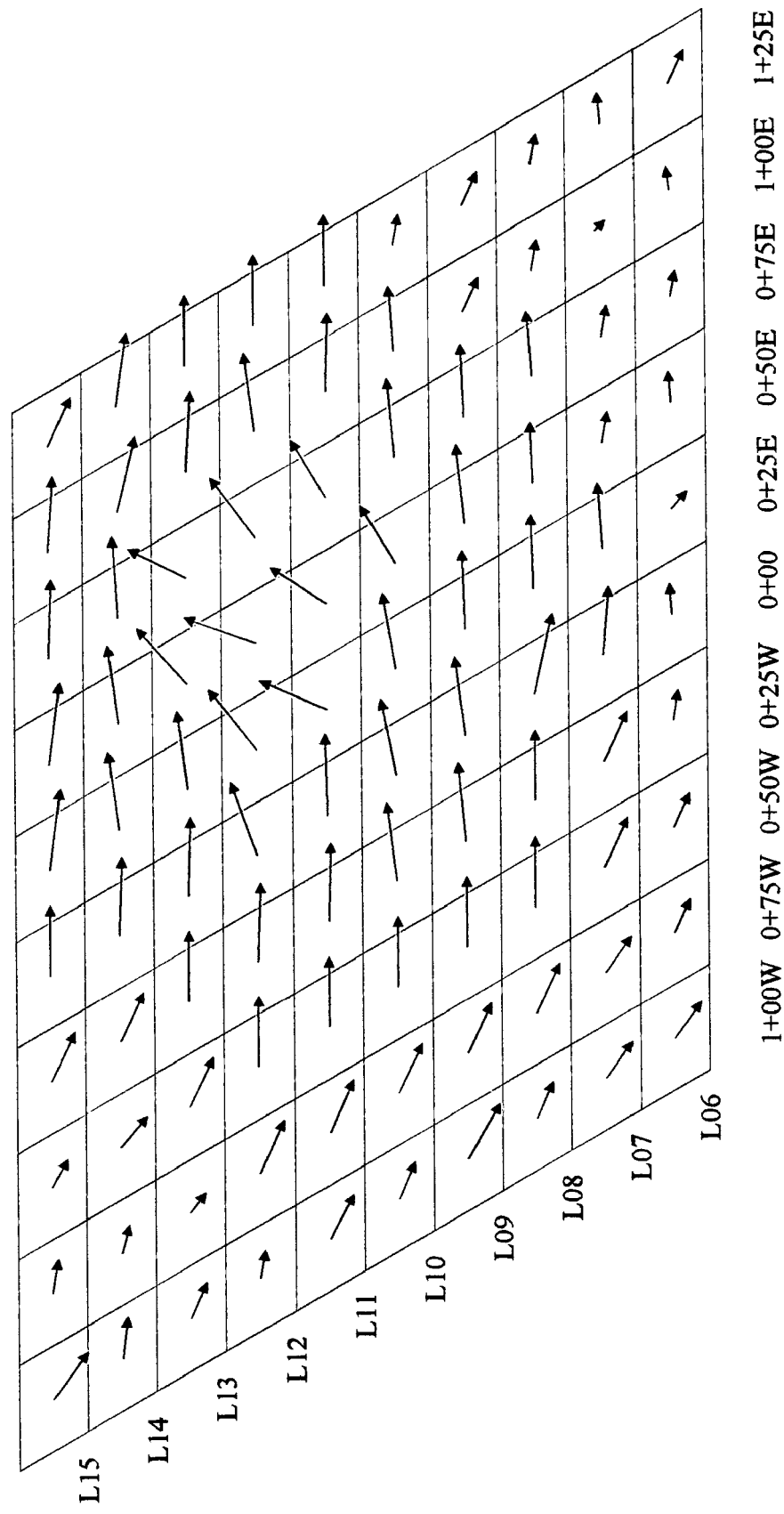
FIG. 5 is a schematic diagram of a two-dimensional grid surface defined for locating the collection sites of the three-dimensional information (3D vectors).
Figure 7:
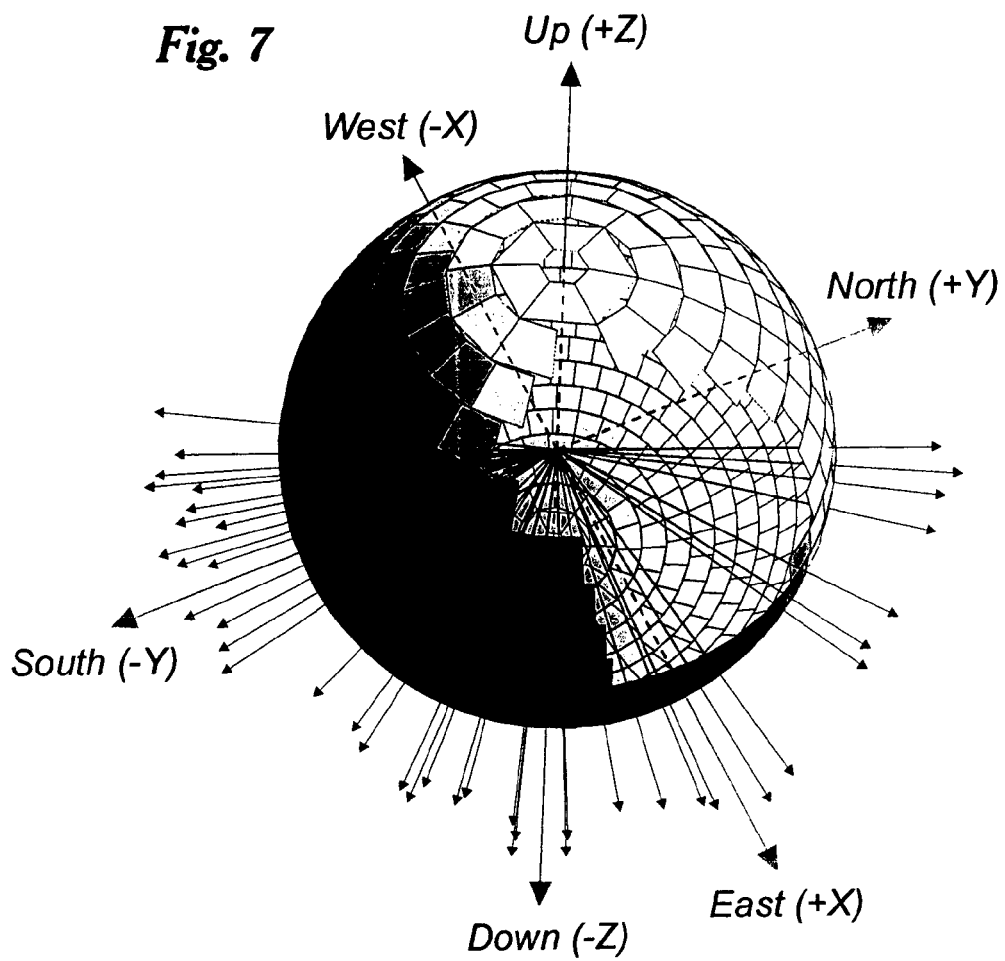
FIG. 7 shows an HSV colour coded sphere sectored in planes of equal area, each denoting a specific HSV colour with the 3D vectors being oriented so as to emanate from the origin to intersect a uniquely coloured surface of the sphere. It should be noted that this sectored sphere is presented in this illustration for the basis of clarity of methodology. In reality a continuum of millions of colours will be more frequently used.
Figure 10:
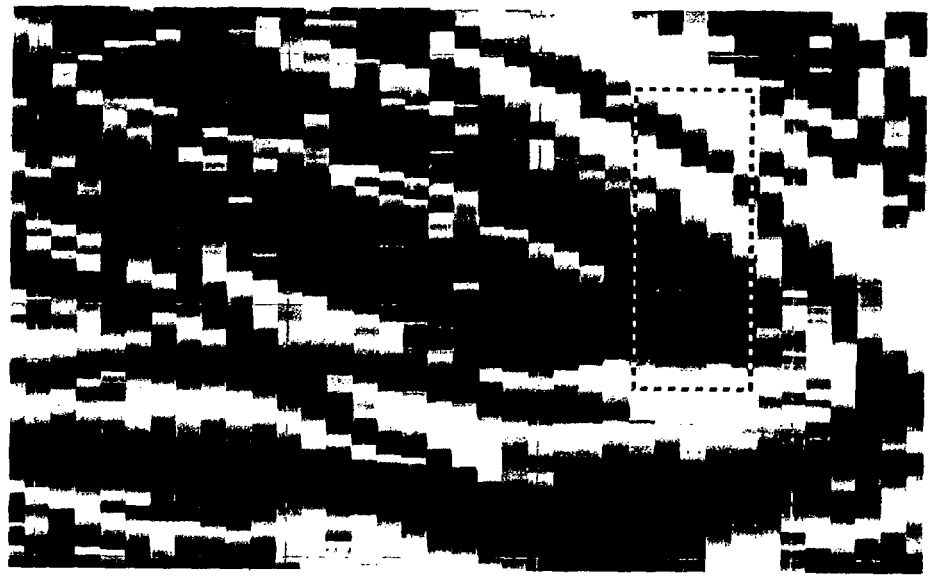
FIG. 10 illustrates a further endowment of this methodology that allows for the ability to illustrate a scattergram distribution of vector orientation on a projection.

After each of the spherical co-ordinate vectors have been associated with an HSV value, see the table of FIG. 10, the colour representing the HSV value is then applied as a fill colour to a rectangular area centred at each of the corresponding measuring station locations along the lines with respect to the overall grid. FIG. 5 shows the vectors as arrows occurring at the centre of a rectangular cell around the location of their measurement point illustrating the difficulty in determining change in magnitude, verses a change in foreshortened length due to a change in dip.

Figure 8:
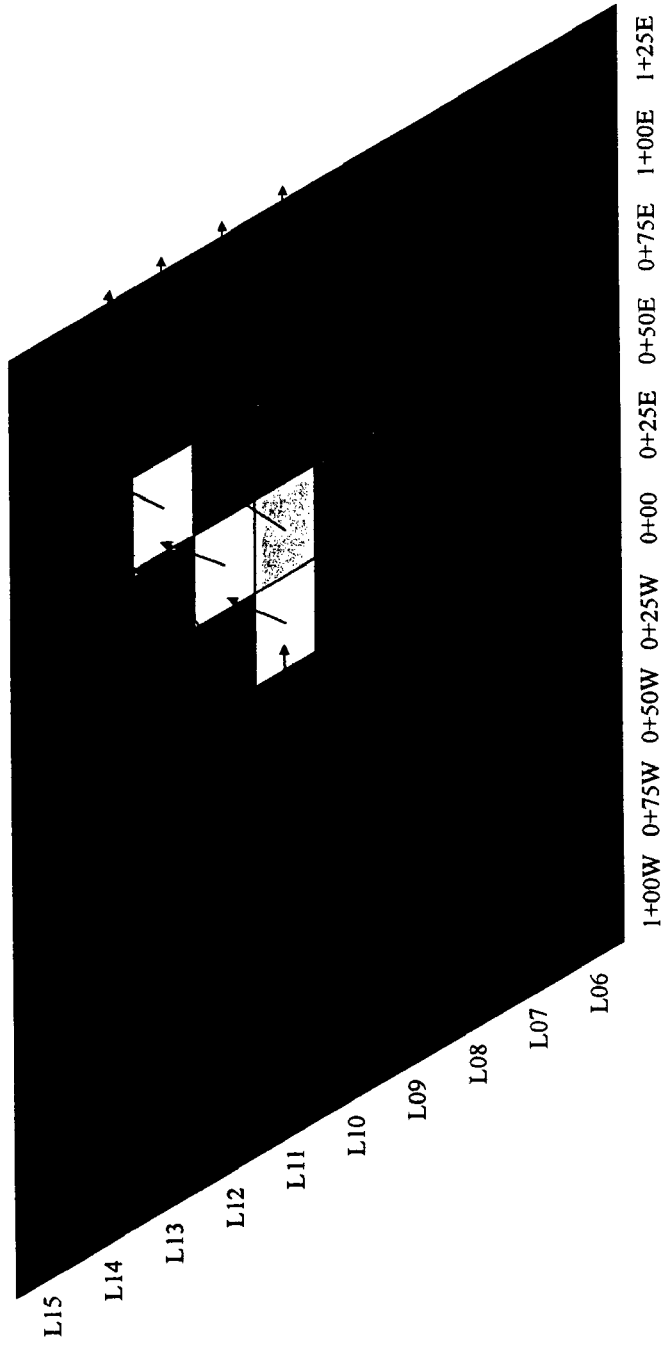
FIG. 8 is a table illustrates azimuth and dip angles of the 3D vectors as per the grid in FIG. 2.

FIGS. 8 and 9 provide two-dimensional displays of the magnetic field data in accordance with an embodiment of the present method. For enhanced clarity, in FIGS. 5, 8 and 9, the lines of the grid are not shown but lie along the centre of each grid cell.

These coloured areas located about each of the measuring stations may also be input into any of the many standard contour algorithms that exist for plotting of these coloured pixelated areas to produce a colour map with gradational interstitial colours applied between the lines and covering the whole area. These interstitial colours could represent, along observed trends, the shortest distance between the two colours as illustrated on the spherical colour model.

Figure 10A:
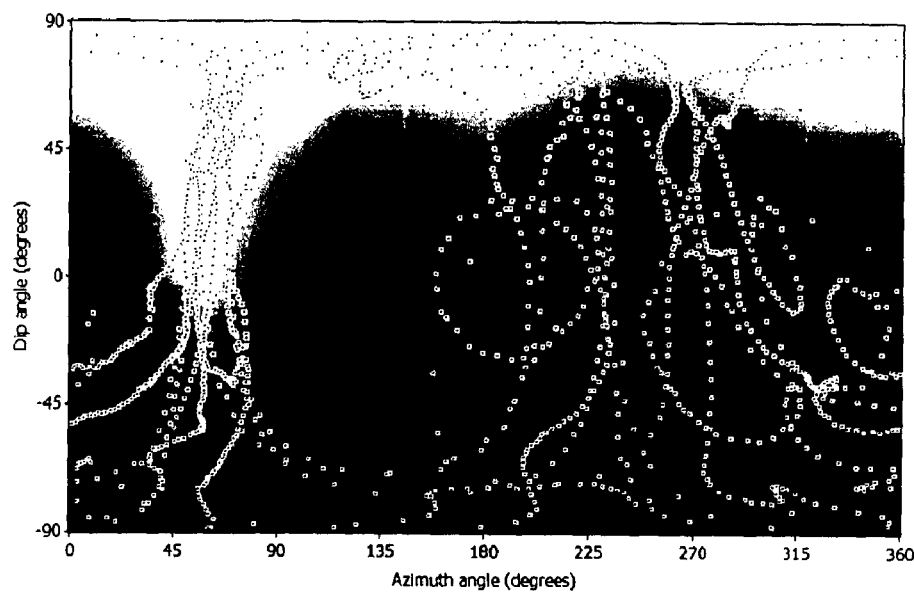
FIG. 10a illustrates a section taken from FIG. 10 further expanding the details of the orientations of the vectors.

With the advent of computer processing capabilities, the unique display of this vector orientation data lends itself to a number of useful statistical presentations. In FIG. 10 we see that an area of the colour coded data grid area can be selected (FIG. 10) and the orientation of all vectors within this area can be plotted on an orthogonal grid as a function of dip angle versus Azimuth (FIG. 10a). This can allow for the fine cognitive discrimination of very subtle orientation regimes.

Figure 11:
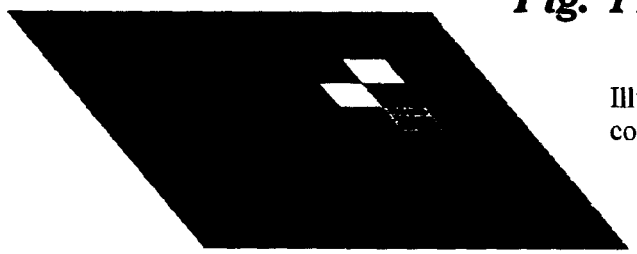
FIGS. 11, 11a and 11b illustrate an endowment of this methodology that shows how a range of vector orientations may be sectored out and given higher visual discrimination to further emphasize subtle changes in vector orientation.
Figure 11A:
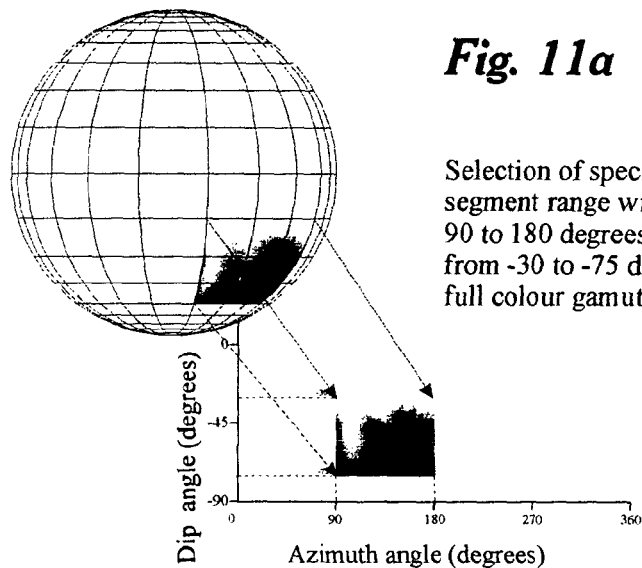
Figure 11B:
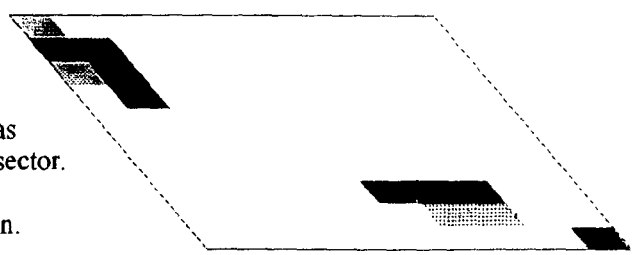

FIG. 11 shows another attribute of this vector orientation presentation, which allows for the enhanced discretion of specific selected orientation. In this scenario a specific range of dip and azimuth angles are selected. This selection is illustrated in the highlighted quadrant of the sphere (FIG. 11a) or the rectangular area expressed on the orthogonal dip verses azimuth plot (FIG. 11b). A new colour chart is then created that contains the full complement of colours as the original model (FIG. 13). The appropriate cells that contain the dip and azimuth values within this range are displayed on the plan view of the grid area utilizing the full gamut of colours available.

Additionally the magnitude of the vectors may also be shown on the coloured illustration either as dashed black and white line contours or as a Digital Elevation Model.

Alternatively to the ground acquisition method described earlier, an aircraft flying over the grid may retrieve the above information. After the grid has been determined, the aircraft flies over a prescribed calculated grid lines to record the magnetic vector information at regular time intervals corresponding to a specified distance given the airspeed flown. In order to ensure that the aircraft follows the calculated grid lines, a GPS is to be used to guide the aircraft. In this aerial data collection no baseline or ground demarcation of lines is required.

The magnetic field vector information is collected via instruments on the aircraft as they fly over the measuring station and stored on record keeping equipment, such as a data logger, located on the aircraft. Calibration and corrections to the data are carried out later after each day's flying.

Figure 12:
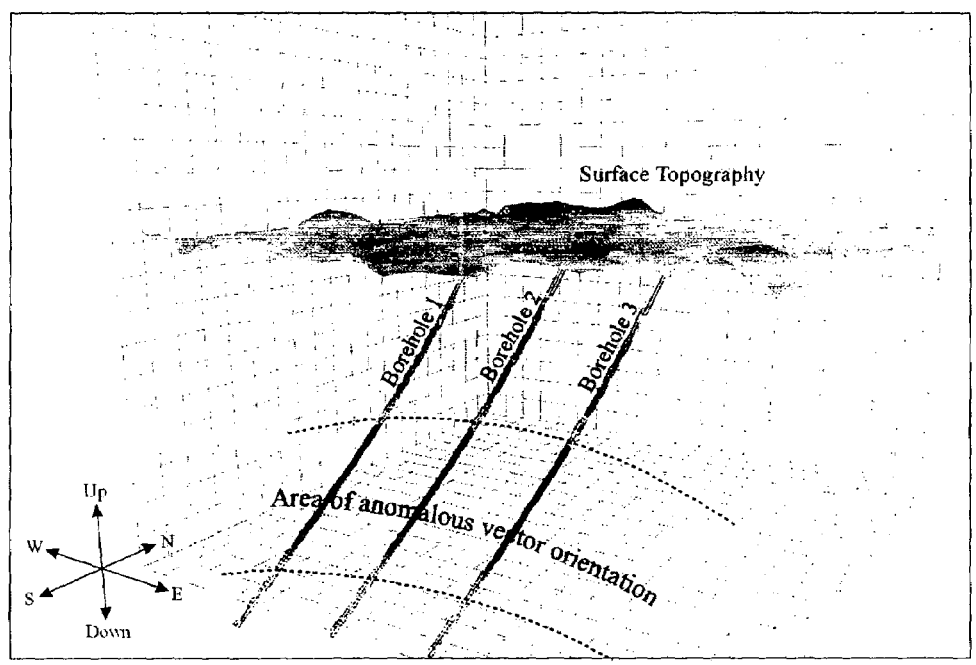
FIG. 12 illustrates the described methodology of colour coded vector orientation as being applied to voxels located at sampled points along the 3D survey trajectory of a curvilinear borehole.

An example of the 3D versatility of this colour coded vector orientation methodology is also given in FIG. 12 where the method illustrates vector orientation sample points collected along a borehole within a given volume by the use of coloured voxels.

What I claim as my invention:

1. A method for displaying the three-dimensional vector orientations of magnetic fields on a two-dimensional surface comprising the following steps:
   a. establishing a sampling grid over an area of geological interest having magnetic fields;
   b. locating equally-spaced measuring stations for measuring said magnetic fields on said sampling grid, wherein said measuring stations are designated by letters;
   c. creating a two-dimensional map of the sampling grid;
   d. establishing a calibration station using a stationary tri-axial magnetometer for calibrating said magnetic fields, wherein said calibration station is located proximate to said sampling grid, and further wherein the calibration station is located in a magnetically quiet area;
   e. conducting a calibration step at the calibration station, wherein said calibration step comprises the steps of:
      i. obtaining a first measurement of the magnetic field in X, Y and Z directions using said stationary tri-axial magnetometer;
      ii. obtaining a second measurement of the magnetic field in X, Y and Z directions using an operator held portable tri-axial magnetometer;
      iii. determining the effect of said operator holding the portable tri-axial magnetometer on said second measurement; and
      iv. calibrating said effect to the portable tri-axial magnetometer so that the effect of the operator is nullified;
   f. conducting a survey step of obtaining magnetic field measurements at each of said measuring stations using said portable tri-axial magnetometer and recording the time at which said magnetic field measurements were taken, wherein the magnetic field measurements are represented in three dimensions as Cartesian coordinates $X_a, Y_a$ and $Z_a$ where "a" indicates the measuring station designation, and wherein said survey step occurs over a period of time;
   g. measuring the magnetic field at the calibration station over said period of time and determining an average magnetic field measurement over the period of time in order to obtain a calibration value corresponding to the time that the magnetic field measurements are made;
   h. correcting the magnetic field measurements by subtracting said calibration value in order to obtain a calibrated value for each of the magnetic field measurements $X_{calibrated}, Y_{calibrated}$ and $Z_{calibrated}$;
   i. correcting said calibrated value for each of the magnetic field measurements by subtracting the value of the magnetic field of the earth at each measuring station to obtain a residual value for each magnetic field measurement $X_{residual}, Y_{residual}$ and $Z_{residual}$, wherein said value of the magnetic field of the earth is determined by applying the International Geomagnetic Reference Field; and
   j. correcting said residual value by subtracting the values of induced magnetic fields to obtain a remanent value for each magnetic field measurement $X_{remanent}, Y_{remanent}$ and $Z_{remanent}$.

2. The method of claim 1 comprising the further step of transferring Cartesian remanent values to mathematical spherical coordinates $r_{math}$, $theta_{math}$ and $phi_{math}$.

3. The method of claim 2 further comprising the step of translating said mathematical spherical coordinates to geological coordinates $r_g$, $theta_g$ and $phi_g$.

4. The method of claim 3 further comprising the step of applying a color notation model to each of said geological coordinates wherein said color notation has a direct symmetry to the geological coordinates and so that a unique color hue represents a specific value and direction of a three dimensional vector obtained at each of the measuring stations, and further wherein said specific value and direction of the three dimensional vector representing a measuring station is shown as a colored pixel.

5. The method of claim 4 wherein said color notation model is selected from a group of color notation models comprising the following color notation models: RGB, CIE, HSV, HSL, CIE XYZ, YIQ, Munsell, TekHVC and CIE LUV.

6. The method of claim 5 wherein said unique color hue is overlaid on said two-dimensional map for each of the measuring stations thereby producing a pixilated two-dimensional map of three-dimensional magnetic field data.

* * * * *